US009180345B2

(12) United States Patent
Isogawa

(10) Patent No.: US 9,180,345 B2
(45) Date of Patent: Nov. 10, 2015

(54) GOLF BALL

(75) Inventor: Kazuhiko Isogawa, Kobe (JP)

(73) Assignee: DUNLOP SPORTS CO. LTD., Kobe-shi (JP)

(*) Notice: Subject to any disclaimer, the term of this patent is extended or adjusted under 35 U.S.C. 154(b) by 626 days.

(21) Appl. No.: 13/166,914

(22) Filed: Jun. 23, 2011

(65) Prior Publication Data

US 2012/0021852 A1 Jan. 26, 2012

(30) Foreign Application Priority Data

Jul. 23, 2010 (JP) ................................. 2010-165573

(51) Int. Cl.

| | |
|---|---|
| ***C09J 163/00*** | (2006.01) |
| ***C09J 163/10*** | (2006.01) |
| ***A63B 37/00*** | (2006.01) |
| ***C09J 179/02*** | (2006.01) |

(52) U.S. Cl.

CPC ......... *A63B 37/0031* (2013.01); *A63B 37/0043* (2013.01); *A63B 37/0046* (2013.01); *A63B 37/0076* (2013.01); *A63B 37/0092* (2013.01); *C09J 163/00* (2013.01); *C09J 163/10* (2013.01); *C09J 179/02* (2013.01); *A63B 37/0039* (2013.01)

(58) Field of Classification Search

CPC ....... A63B 37/0039; C08K 5/17; C08K 5/175

See application file for complete search history.

(56) References Cited

U.S. PATENT DOCUMENTS

| | | | | |
|---|---|---|---|---|
| 4,611,036 | A * | 9/1986 | Sekiguchi et al. | 525/481 |
| 6,106,415 | A * | 8/2000 | Masutani et al. | 473/374 |
| 6,702,695 | B1 | 3/2004 | Higuchi et al. | |
| 7,378,461 | B2 * | 5/2008 | Haraguchi et al. | 523/445 |
| 2001/0002372 | A1 | 5/2001 | Ichikawa et al. | |
| 2002/0010287 | A1 * | 1/2002 | Ohashi et al. | 525/486 |
| 2002/0086744 | A1 | 7/2002 | Ichikawa et al. | |
| 2003/0104880 | A1 * | 6/2003 | Fushihara | 473/378 |
| 2005/0065295 | A1 * | 3/2005 | Christiansen et al. | 525/523 |
| 2006/0025240 | A1 * | 2/2006 | Endo et al. | 473/371 |
| 2006/0025241 | A1 * | 2/2006 | Endo et al. | 473/371 |
| 2006/0211517 | A1 * | 9/2006 | Isogawa et al. | 473/371 |
| 2008/0045659 | A1 * | 2/2008 | Hakuya et al. | 525/190 |

FOREIGN PATENT DOCUMENTS

| | | | |
|---|---|---|---|
| JP | 7-308990 | A | 11/1995 |
| JP | 9-241482 | A | 9/1997 |
| JP | 2000-248229 | A | 9/2000 |
| JP | 2006-257142 | A | 9/2006 |

* cited by examiner

*Primary Examiner* — John E Simms, Jr.

(74) *Attorney, Agent, or Firm* — Birch Stewart Kolasch & Birch, LLP

(57) ABSTRACT

A golf ball 2 includes a spherical core 4, an adhesive layer 6 covering the core 4, and a cover 8 covering the adhesive layer 6. The core 4 includes a spherical center 10 and a mid layer 12 covering the center 10. The adhesive layer 6 is formed from an adhesive. The base polymer of the adhesive is a two-component curing type epoxy resin obtained by curing a bisphenol A type epoxy resin with a curing agent including a polyamine compound. The gel fraction of the adhesive is equal to or greater than 40% but equal to or less than 80%. The ratio of the epoxy equivalent to the amine active hydrogen equivalent in the adhesive is equal to or greater than 2.0/1.0 but equal to or less than 13.0/1.0. The amine active hydrogen equivalent of the curing agent is equal to or greater than 100 g/eq but equal to or less than 800 g/eq. In the adhesive, the proportion of water to the entire volatile component is equal to or greater than 90% by weight.

10 Claims, 1 Drawing Sheet

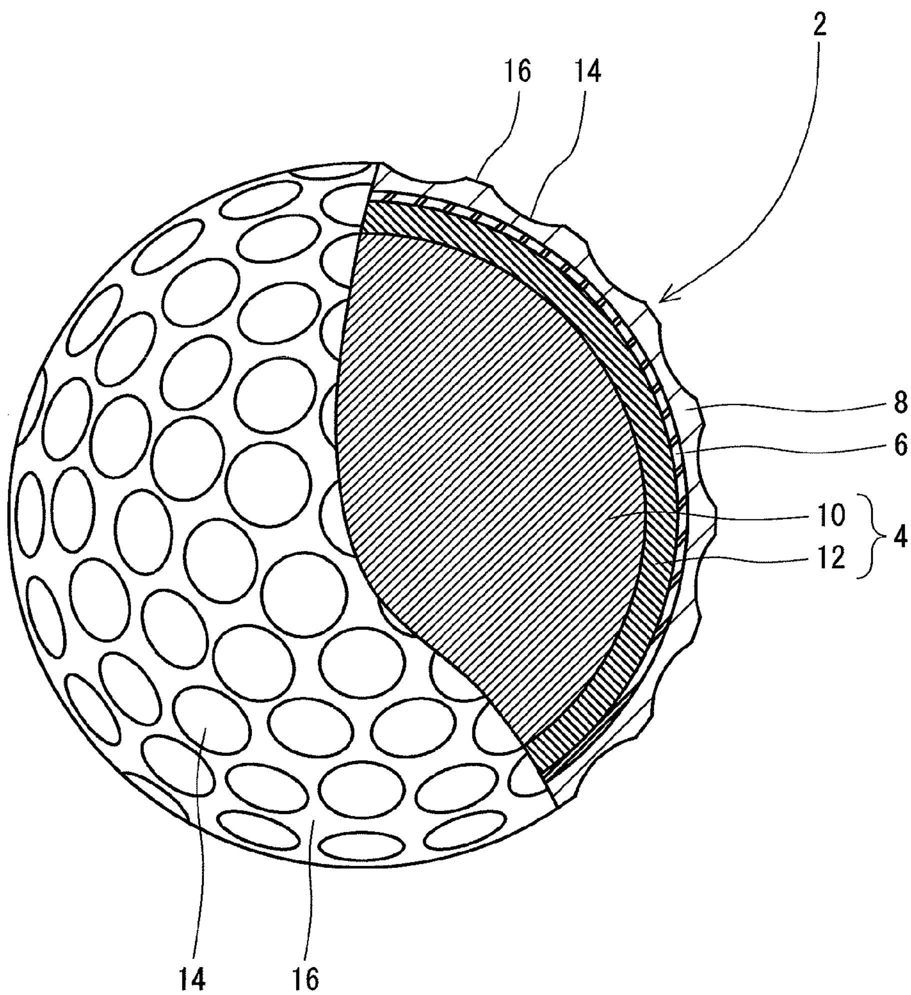
2
16
14
8
6
10
12
4
14
16

GOLF BALL

This application claims priority on Patent Application No. 2010-165573 filed in JAPAN on Jul. 23, 2010. The entire contents of this Japanese Patent Application are hereby incorporated by reference.

BACKGROUND OF THE INVENTION

1. Field of the Invention

The present invention relates to golf balls. Specifically, the present invention relates to golf balls including a first layer, a second layer, and an adhesive layer positioned between the first layer and the second layer.

2. Description of the Related Art

Golf players place importance on spin performance of golf balls. When a backspin rate is high, the run is short. It is easy for golf players to cause a golf ball, to which backspin is easily provided, to stop at a target point. When a sidespin rate is high, the golf ball tends to curve. It is easy for golf players to intentionally cause a golf ball, to which sidespin is easily provided, to curve. A golf ball having excellent spin performance has excellent controllability. In particular, advanced golf players place importance on controllability upon a shot with a short iron.

For golf players, durability of golf balls is also important. A golf ball that does not break even by repeated hitting is desired. In addition, a golf ball in which a scuff and a wrinkle are unlikely to occur in a cover when being hit with a short iron is desired.

In light of controllability, golf balls having various structures have been proposed. JPH11-137725 (US 2001/0002372, US 2002/0086744) discloses a golf ball that includes an inner cover formed from an ionomer resin and an outer cover formed from a thermoplastic elastomer. JP2001-54588 (U.S. Pat. No. 6,702,695) discloses a golf ball that includes an inner cover having a Shore D hardness of 45 to 61 and an outer cover having a Shore D hardness of 35 to 55. JP2006-34745 (US 2006/0025241) discloses a golf ball that includes a mid layer formed from an ionomer resin and a cover formed from a thermoplastic polyurethane elastomer. JP2006-289059 (US 2006/0211517) discloses a golf ball that includes a mid layer including a styrene block-containing thermoplastic elastomer and a cover formed from an ionomer resin.

In a golf ball including a mid layer (namely, an inner cover) and a cover, insufficient adhesion between the mid layer and the cover leads to breakage of the golf ball. The insufficient adhesion also leads to a scuff and a wrinkle in the cover. The insufficient adhesion further leads to loss of energy transfer when the golf ball is hit with a golf club. The loss impairs the resilience performance of the golf ball.

In the golf balls disclosed in the above four publications, an adhesive layer is present between the mid layer and the cover. The golf ball disclosed in JPH11-137725 includes an adhesive layer formed from a copolymer of an olefin compound and glycidyl methacrylate. The golf ball disclosed in JP2001-54588 includes an adhesive layer formed from a polyurethane or a chlorinated polyolefin. The golf ball disclosed in JP2006-34745 includes an adhesive layer formed from a two-component curing type epoxy resin. The golf ball disclosed in JP2006-289059 includes an adhesive layer formed from a reaction product of a carboxyl group-containing polyurethane and a polycarbodiimide.

In the conventional golf balls, the adhesion between the mid layer and the cover is insufficient. In a golf ball in which a flexible cover is used for the purpose of providing controllability, this adhesion is particularly insufficient.

An object of the present invention is to provide a golf ball having excellent adhesion between a first layer and a second layer.

SUMMARY OF THE INVENTION

A golf ball according to the present invention comprises:

(1) a first layer;

(2) a second layer of which a material differs from a material of the first layer; and (3) an adhesive layer formed from an adhesive and positioned between the first layer and the second layer.

A base polymer of the adhesive is a two-component curing type epoxy resin obtained by curing a bisphenol A type epoxy resin with a curing agent including a polyamine compound. A gel fraction of the adhesive is equal to or greater than 40% but equal to or less than 80%.

The golf ball according to the present invention comprises the adhesive layer formed from the adhesive of which the gel fraction is equal to or greater than 40% but equal to or less than 80%. The adhesive layer enhances the adhesion between the first layer and the second layer. The golf ball has excellent durability and resilience performance.

Preferably, a ratio of an epoxy equivalent of the bisphenol A type epoxy resin to an amine active hydrogen equivalent of the curing agent in the adhesive is equal to or greater than 2.0/1.0 but equal to or less than 13.0/1.0. Preferably, the amine active hydrogen equivalent of the curing agent is equal to or greater than 100 g/eq but equal to or less than 800 g/eq.

A volatile component of the adhesive may include water. Preferably, a proportion of the water to the entire volatile component is equal to or greater than 90% by weight. Preferably, a thickness of the adhesive layer is equal to or greater than 0.001 mm but equal to or less than 0.1 mm.

Preferably, an adhesive strength between the first layer and the second layer is equal to or greater than 20 N. In the golf ball in which a difference between a hardness of the first layer and a hardness of the second layer is equal to or greater than 18, the adhesive layer exerts a particularly superior effect.

The first layer can be formed from a resin composition. Preferably, a principal component of a base polymer of the resin composition is one or more members selected from the group consisting of ionomer resins, polyurethanes, styrene block-containing elastomers, and polyamides. The second layer can be formed from a resin composition. Preferably, a principal component of a base polymer of the resin composition is one or more members selected from the group consisting of ionomer resins, polyurethanes, styrene block-containing elastomers, and polyamides. The principal component of the base polymer of the first layer differs from the principal component of the base polymer of the second layer.

The golf ball can comprise a main body including a plurality of layers, and a paint layer positioned outside the main body. An outermost layer of the main body is the second layer. Preferably, the principal component of the base polymer of the second layer is a polyurethane. Preferably, the second layer has a Shore D hardness of 48 or less and a thickness of 0.6 mm or less. Preferably, the principal component of the base polymer of the first layer is an ionomer resin.

In the golf ball in which a hardness of the first layer is equal to or greater than 55 but equal to or less than 72, the adhesive layer exerts a particularly superior effect. In the golf ball in which a thickness of the first layer is equal to or greater than 0.3 mm but equal to or less than 2.5 mm, the adhesive layer exerts a particularly superior effect.

BRIEF DESCRIPTION OF THE DRAWINGS

FIG. 1 is a partially cutaway cross-sectional view of a golf ball according to one embodiment of the present invention.

DESCRIPTION OF THE PREFERRED EMBODIMENTS

The following will describe in detail the present invention based on preferred embodiments with reference to the accompanying drawings.

A golf ball 2 shown in FIG. 1 includes a spherical core 4, an adhesive layer 6 covering the core 4, and a cover 8 covering the adhesive layer 6. The core 4 includes a spherical center 10 and a mid layer 12 covering the center 10. On the surface of the cover 8, a large number of dimples 14 are formed. Of the surface of the cover 8, a part other than the dimples 14 is a land 16. The golf ball 2 includes a paint layer and a mark layer on the external side of the cover 8 although these layers are not shown in the drawing. The core 4, the adhesive layer 6, and the cover 8 constitute a main body. The cover 8 is the outermost layer of the main body. The golf ball 2 may include, between the center 10 and the mid layer 12, another layer formed from a resin composition or a rubber composition.

The golf ball 2 has a diameter of 40 mm or greater but 45 mm or less. From the standpoint of conformity to the rules established by the United States Golf Association (USGA), the diameter is preferably equal to or greater than 42.67 mm. In light of suppression of air resistance, the diameter is preferably equal to or less than 44 mm and more preferably equal to or less than 42.80 mm. The golf ball 2 has a weight of 40 g or greater but 50 g or less. In light of attainment of great inertia, the weight is preferably equal to or greater than 44 g and more preferably equal to or greater than 45.00 g. From the standpoint of conformity to the rules established by the USGA, the weight is preferably equal to or less than 45.93 g.

The center 10 is obtained by crosslinking a rubber composition. Examples of preferable base rubbers for use in the rubber composition include polybutadienes, polyisoprenes, styrene-butadiene copolymers, ethylene-propylene-diene copolymers, and natural rubbers. In light of resilience performance, polybutadienes are preferred. When a polybutadiene and another rubber are used in combination, it is preferred if the polybutadiene is included as a principal component. Specifically, the proportion of the polybutadiene to the entire base rubber is preferably equal to or greater than 50% by weight and particularly preferably equal to or greater than 80% by weight. A polybutadiene in which the proportion of cis-1,4 bonds is equal to or greater than 40% is preferred, and a polybutadiene in which the proportion of cis-1,4 bonds is equal to or greater than 80% is particularly preferred.

The rubber composition of the center 10 includes a co-crosslinking agent. Examples of preferable co-crosslinking agents in light of resilience performance include monovalent or bivalent metal salts of an $\alpha,\beta$-unsaturated carboxylic acid having 2 to 8 carbon atoms. Specific examples of preferable co-crosslinking agents include zinc acrylate, magnesium acrylate, zinc methacrylate, and magnesium methacrylate. Zinc acrylate and zinc methacrylate are particularly preferred on the grounds that high resilience performance is achieved.

In light of resilience performance of the golf ball 2, the amount of the co-crosslinking agent is preferably equal to or greater than 10 parts by weight and more preferably equal to or greater than 15 parts by weight, per 100 parts by weight of the base rubber. In light of soft feel at impact, the amount is preferably equal to or less than 50 parts by weight and more preferably equal to or less than 45 parts by weight, per 100 parts by weight of the base rubber.

Preferably, the rubber composition of the center 10 includes an organic peroxide together with a co-crosslinking agent. The organic peroxide serves as a crosslinking initiator. The organic peroxide enhances the resilience performance of the golf ball 2. Examples of suitable organic peroxides include dicumyl peroxide, 1,1-bis(t-butylperoxy)-3,3,5-trimethylcyclohexane, 2,5-dimethyl-2,5-di(t-butylperoxy)hexane, and di-t-butyl peroxide. An organic peroxide with particularly high versatility is dicumyl peroxide.

In light of resilience performance of the golf ball 2, the amount of the organic peroxide is preferably equal to or greater than 0.1 parts by weight, more preferably equal to or greater than 0.3 parts by weight, and particularly preferably equal to or greater than 0.5 parts by weight, per 100 parts by weight of the base rubber. In light of soft feel at impact, the amount is preferably equal to or less than 3.0 parts by weight, more preferably equal to or less than 2.5 parts by weight, and particularly preferably equal to or less than 2.0 parts by weight, per 100 parts by weight of the base rubber.

Preferably, the rubber composition of the center 10 includes an organic sulfur compound. Examples of preferable organic sulfur compounds include monosubstitutions such as diphenyl disulfide, bis(4-chlorophenyl)disulfide, bis(3-chlorophenyl)disulfide, bis(4-bromophenyl)disulfide, bis(3-bromophenyl)disulfide, bis(4-fluorophenyl)disulfide, bis(4-iodophenyl)disulfide, bis(4-cyanophenyl)disulfide and the like; disubstitutions such as bis(2,5-dichlorophenyl)disulfide, bis(3,5-dichlorophenyl)disulfide, bis(2,6-dichlorophenyl)disulfide, bis(2,5-dibromophenyl)disulfide, bis(3,5-dibromophenyl)disulfide, bis(2-chloro-5-bromophenyl)disulfide, bis(2-cyano-5-bromophenyl)disulfide and the like; trisubstitutions such as bis(2,4,6-trichlorophenyl)disulfide, bis(2-cyano-4-chloro-6-bromophenyl)disulfide and the like; tetrasubstitutions such as bis(2,3,5,6-tetrachlorophenyl)disulfide and the like; and pentasubstitutions such as bis(2,3,4,5,6-pentachlorophenyl)disulfide, bis(2,3,4,5,6-pentabromophenyl)disulfide and the like. The organic sulfur compound contributes to resilience performance. Particularly preferable organic sulfur compounds are diphenyl disulfide and bis(pentabromophenyl)disulfide.

In light of resilience performance of the golf ball 2, the amount of the organic sulfur compound is preferably equal to or greater than 0.1 parts by weight, more preferably equal to or greater than 0.2 parts by weight, and particularly preferably equal to or greater than 0.3 parts by weight, per 100 parts by weight of the base rubber. In light of soft feel at impact, the amount is preferably equal to or less than 2.0 parts by weight, more preferably equal to or less than 1.5 parts by weight, and particularly preferably equal to or less than 1.0 parts by weight, per 100 parts by weight of the base rubber.

For the purpose of adjusting specific gravity and the like, the rubber composition of the center 10 may include a filler. Examples of suitable fillers include zinc oxide, barium sulfate, calcium carbonate, and magnesium carbonate. The rubber composition may include, as a filler, powder of a metal with a high specific gravity. Specific examples of metals with a high specific gravity include tungsten and molybdenum. The amount of the filler is determined as appropriate so that the intended specific gravity of the center 10 is accomplished. A particularly preferable filler is zinc oxide. Zinc oxide serves not only as a specific gravity adjuster but also as a crosslinking activator. According to need, various additives such as sulfur, an anti-aging agent, a coloring agent, a plasticizer, a dispersant and the like are included in the rubber composition of the center 10 in an adequate amount. Crosslinked rubber powder or synthetic resin powder may also be included in the center 10.

In light of resilience performance of the golf ball 2, the center 10 has a surface hardness of preferably 65 or greater, more preferably 75 or greater, and particularly preferably 80 or greater. In light of feel at impact of the golf ball 2, the surface hardness is preferably equal to or less than 95, more preferably equal to or less than 90, and particularly preferably equal to or less than 85. The surface hardness is measured by pressing a JIS-C type spring hardness scale against the surface of the center 10. For the measurement, an automated rubber hardness measurement machine (trade name "P1", manufactured by Kobunshi Keiki Co., Ltd.), to which this hardness scale is mounted, is used.

The center 10 has a diameter of preferably 25.0 mm or greater but 41.5 mm or less. The center 10 has a weight of preferably 25 g or greater but 42 g or less. The temperature for crosslinking the center 10 is generally equal to or higher than 140° C. but equal to or lower than 180° C. The time period for crosslinking the center 10 is generally equal to or longer than 10 minutes but equal to or shorter than 60 minutes. The center 10 may be formed with two or more layers. The center 10 may have a rib on its surface.

The mid layer 12 (first layer) is formed from a resin composition. The base polymer of the resin composition is an ionomer resin. The ionomer resin is highly elastic. As described later, the cover 8 of the golf ball 2 is extremely thin. When the golf ball 2 is hit with a driver, the mid layer 12 significantly deforms. The mid layer 12 in which the ionomer resin is used contributes to flight performance upon a shot with a driver.

Examples of preferable ionomer resins include binary copolymers formed with an α-olefin and an α,β-unsaturated carboxylic acid having 3 to 8 carbon atoms. A preferable binary copolymer includes 80% by weight or more and 90% by weight or less of an α-olefin, and 10% by weight or more and 20% by weight or less of an α,β-unsaturated carboxylic acid. The binary copolymer has excellent resilience performance. Examples of other preferable ionomer resins include ternary copolymers formed with: an α-olefin; an α,β-unsaturated carboxylic acid having 3 to 8 carbon atoms; and an α,β-unsaturated carboxylate ester having 2 to 22 carbon atoms. A preferable ternary copolymer includes 70% by weight or more and 85% by weight or less of an α-olefin, 5% by weight or more and 30% by weight or less of an α,β-unsaturated carboxylic acid, and 1% by weight or more and 25% by weight or less of an α,β-unsaturated carboxylate ester. The ternary copolymer has excellent resilience performance. For the binary copolymer and the ternary copolymer, preferable α-olefins are ethylene and propylene, while preferable α,β-unsaturated carboxylic acids are acrylic acid and methacrylic acid. A particularly preferable ionomer resin is a copolymer formed with ethylene and acrylic acid or methacrylic acid.

In the binary copolymer and the ternary copolymer, some of the carboxyl groups are neutralized with metal ions. Examples of metal ions for use in neutralization include sodium ion, potassium ion, lithium ion, zinc ion, calcium ion, magnesium ion, aluminum ion, and neodymium ion. The neutralization may be carried out with two or more types of metal ions. Particularly suitable metal ions in light of resilience performance and durability of the golf ball 2 are sodium ion, zinc ion, lithium ion, and magnesium ion.

Specific examples of ionomer resins include trade names "Himilan 1555", "Himilan 1557", "Himilan 1605", "Himilan 1706", "Himilan 1707", "Himilan 1856", "Himilan 1855", "Himilan AM7311", "Himilan AM7315", "Himilan AM7317", "Himilan AM7318", "Himilan MK7320", and "Himilan MK7329", manufactured by Du Pont-MITSUI POLYCHEMICALS Co., Ltd.; trade names "Surlyn 6120", "Surlyn 6320", "Surlyn 6910", "Surlyn 7930", "Surlyn 7940", "Surlyn 8140", "Surlyn 8150", "Surlyn 8940", "Surlyn 8945", "Surlyn 9120", "Surlyn 9150", "Surlyn 9910", "Surlyn 9945", "Surlyn AD8546", "HPF1000", and "HPF2000", manufactured by E. I. du Pont de Nemours and Company; and trade names "IOTEK 7010", "IOTEK 7030", "IOTEK 7510", "IOTEK 7520", "IOTEK 8000", and "IOTEK 8030", manufactured by ExxonMobil Chemical Corporation. Two or more types of ionomer resins may be used in combination.

The resin composition of the mid layer 12 may include another resin instead of or together with an ionomer resin. Examples of the other resin include styrene block-containing thermoplastic elastomers, polyamides, and polyurethanes. When an ionomer resin and another resin are used in combination, it is preferred if the ionomer resin is included as the principal component of the base polymer, in light of flight performance. The proportion of the ionomer resin to the entire base polymer is preferably equal to or greater than 50% by weight, more preferably equal to or greater than 70% by weight, and particularly preferably equal to or greater than 85% by weight.

A resin suitable for the mid layer 12, other than the ionomer resin, is a styrene block-containing thermoplastic elastomer. The styrene block-containing thermoplastic elastomer includes a polystyrene block as a hard segment, and a soft segment. A typical soft segment is a diene block. Examples of diene compounds in the diene block include butadiene, isoprene, 1,3-pentadiene, and 2,3-dimethyl-1,3-butadiene. Butadiene and isoprene are preferred. Two or more compounds may be used in combination.

Examples of styrene block-containing thermoplastic elastomers include styrene-butadiene-styrene block copolymers (SBS), styrene-isoprene-styrene block copolymers (SIS), styrene-isoprene-butadiene-styrene block copolymers (SIBS), hydrogenated SBS, hydrogenated SIS, and hydrogenated SIBS. Examples of hydrogenated SBS include styrene-ethylene-butylene-styrene block copolymers (SEBS). Examples of hydrogenated SIS include styrene-ethylene-propylene-styrene block copolymers (SEPS). Examples of hydrogenated SIBS include styrene-ethylene-ethylene-propylene-styrene block copolymers (SEEPS).

In light of resilience performance of the golf ball 2, the content of the styrene component in the styrene block-containing thermoplastic elastomer is preferably equal to or greater than 10% by weight, more preferably equal to or greater than 12% by weight, and particularly preferably equal to or greater than 15% by weight. In light of feel at impact of the golf ball 2, the content is preferably equal to or less than 50% by weight, more preferably equal to or less than 47% by weight, and particularly preferably equal to or less than 45% by weight.

In the present invention, styrene block-containing thermoplastic elastomers include alloys of olefin and one or more types selected from the group consisting of SBS, SIS, SIBS, SEBS, SEPS, SEEPS, and hydrogenated products thereof. The olefin component in the alloy is presumed to contribute to improvement of compatibility with another base polymer. Use of this alloy improves the resilience performance of the golf ball 2. An olefin having 2 to 10 carbon atoms is preferably used. Examples of suitable olefins include ethylene, propylene, butene, and pentene. Ethylene and propylene are particularly preferred.

Specific examples of polymer alloys include trade names "Rabalon T3221C", "Rabalon T3339C", "Rabalon SJ4400N", "Rabalon SJ5400N", "Rabalon SJ6400N", "Rabalon SJ7400N", "Rabalon SJ8400N", "Rabalon SJ9400N", and "Rabalon SR04", manufactured by Mitsubishi Chemical Corporation. Other specific examples of styrene block-containing thermoplastic elastomers include trade name "Epofriend A1010" manufactured by Daicel Chemical Industries, Ltd., and trade name "Septon HG-252" manufactured by Kuraray Co., Ltd.

For the purpose of adjusting specific gravity and the like, a filler may be included in the resin composition of the mid layer 12. Examples of suitable fillers include zinc oxide, barium sulfate, calcium carbonate, and magnesium carbonate. Powder of a metal with a high specific gravity may be included as a filler. Specific examples of metals with a high specific gravity include tungsten and molybdenum. The amount of the filler is determined as appropriate so that the intended specific gravity of the mid layer 12 is accomplished. A coloring agent, crosslinked rubber powder, or synthetic resin powder may be included in the mid layer 12.

In light of flight performance upon a shot with a driver, the mid layer 12 has a hardness Hm of preferably 55 or greater, more preferably 58 or greater, and particularly preferably 60 or greater. In light of feel at impact, the hardness Hm is preferably equal to or less than 72, more preferably equal to or less than 70, and particularly preferably equal to or less than 68.

In the present invention, the hardness Hm of the mid layer 12 and the hardness Hc of the cover 8 are measured according to the standards of "ASTM-D 2240-68". For the measurement, an automated rubber hardness measurement machine (trade name "P1", manufactured by Kobunshi Keiki Co., Ltd.), to which a Shore D type spring hardness scale is mounted, is used. For the measurement, a sheet that is formed by hot press, that is formed from the same material as that of the mid layer 12 (or the cover 8), and that has a thickness of about 2 mm is used. Prior to the measurement, a sheet is maintained at 23° C. for two weeks. At the measurement, three sheets are stacked.

In light of flight performance upon a shot with a driver, a mid layer 12 has a thickness Tm of preferably 0.3 mm or greater, more preferably 0.5 mm or greater, and particularly preferably 0.7 mm or greater. In light of feel at impact, the thickness Tm is preferably equal to or less than 2.5 mm and more preferably equal to or less than 2.0 mm. The thickness Tm is measured at a position directly below the land 16.

In light of adhesion of the mid layer 12 to the adhesive layer 6 or the cover 8, it is preferred if the surface of the mid layer 12 is subjected to treatment to increase the roughness. Specific examples of the treatment include brushing and polishing.

The cover 8 (second layer) is formed from a resin composition. The base polymer of the resin composition is a thermoplastic polyurethane elastomer. The thermoplastic polyurethane elastomer is flexible. When the golf ball 2 including the cover 8 formed from the thermoplastic polyurethane elastomer is hit with a short iron, the spin rate is high. The cover 8 formed from the thermoplastic polyurethane elastomer contributes to controllability upon a shot with a short iron. The thermoplastic polyurethane elastomer also contributes to the scuff resistance of the cover 8.

The thermoplastic polyurethane elastomer includes a polyurethane component as a hard segment, and a polyester component or a polyether component as a soft segment. Examples of the curing agent for the polyurethane component include alicyclic diisocyanates, aromatic diisocyanates, and aliphatic diisocyanates.

Examples of alicyclic diisocyanates include 4,4'-dicyclohexylmethane diisocyanate ($H_{12}MDI$) 1,3-bis(isocyanatomethyl)cyclohexane ($H_6XDI$), isophorone diisocyanate (IPDI), and trans-1,4-cyclohexane diisocyanate (CHDI). In light of versatility and processability, $H_{12}MDI$ is preferred. Examples of aromatic diisocyanates include 4,4'-diphenylmethane diisocyanate (MDI) and toluene diisocyanate (TDI). Examples of aliphatic diisocyanates include hexamethylene diisocyanate (HDI). Two or more types of diisocyanates may be used in combination.

Preferable curing agents are alicyclic diisocyanates. Because an alicyclic diisocyanate does not have any double bond in the main chain, the alicyclic diisocyanate suppresses yellowing of the cover 8. In addition, an alicyclic diisocyanate has excellent strength, the alicyclic diisocyanate suppresses a scuff on the cover 8.

Specific examples of thermoplastic polyurethanes include trade names "Elastollan XNY80A", "Elastollan XNY85A", "Elastollan XNY90A", "Elastollan XNY97A", "Elastollan XNY585", and "Elastollan XKP016N", manufactured by BASF Japan Ltd.; and trade names "RESAMINE P4585LS" and "RESAMINE PS62490", manufactured by Dainichiseika Color & Chemicals Mfg. Co., Ltd. From the standpoint that a low hardness of the cover 8 can be achieved, "Elastollan XNY80A", "Elastollan XNY85A", and "Elastollan XNY90A" are particularly preferred.

The resin composition of the cover 8 may include another resin instead of or together with a thermoplastic polyurethane elastomer. Examples of the other resin include thermosetting polyurethanes, styrene block-containing thermoplastic elastomers, polyamides, and ionomer resins. When a thermoplastic polyurethane elastomer and another resin are used in combination, the thermoplastic polyurethane elastomer is included as the principal component of the base polymer, in light of controllability. The proportion of the thermoplastic polyurethane elastomer to the entire base polymer is preferably equal to or greater than 50% by weight, more preferably equal to or greater than 70% by weight, and particularly preferably equal to or greater than 85% by weight.

According to need, a coloring agent such as titanium dioxide, a filler such as barium sulfate, a dispersant, an antioxidant, an ultraviolet absorber, a light stabilizer, a fluorescent material, a fluorescent brightener and the like are included in the cover 8 in an adequate amount. For the purpose of adjusting specific gravity, powder of a metal with a high specific gravity, such as tungsten, molybdenum and the like, may be included in the cover 8.

The hardness Hc of the cover 8 is equal to or less than 48. The cover 8 is flexible. By using the flexible cover 8, excellent controllability upon a shot with a short iron can be achieved. In light of controllability, the hardness Hc is preferably equal to or less than 47 and particularly preferably equal to or less than 38. In light of flight performance upon a shot with a driver, the hardness Hc is preferably equal to or greater than 15, more preferably equal to or greater than 20, and particularly preferably equal to or greater than 26.

As described later, the adhesive layer 6 enhances the adhesion of the cover 8 to the mid layer 12. The effect of the adhesive layer 6 is remarkable in the golf ball 2 in which the difference (Hm−Hc) between the hardness Hm of the mid layer 12 and the hardness Hc of the cover 8 is equal to or greater than 18. The effect is particularly remarkable in the golf ball 2 in which the difference (Hm−Hc) is equal to or greater than 27.

The cover 8 has a thickness Tc of preferably 0.6 mm or less. As described above, the cover 8 has a low hardness. The cover 8 having a low hardness is disadvantageous to the resilience coefficient of the golf ball 2. Upon a shot with a driver, the mid layer 12 and the center 10 also significantly deform. By setting the thickness Tc to be equal to or less than 0.6 mm, the cover 8 does not have a significantly adverse effect on the resilience coefficient upon a shot with a driver, even though the cover 8 has a low hardness. By using the ionomer resin for the mid layer 12, excellent flight performance upon a shot with a driver can be achieved. The thickness Tc is measured at the land 16.

In light of flight performance, the thickness Tc is more preferably equal to or less than 0.5 mm and particularly preferably equal to or less than 0.4 mm. In light of ease of forming the cover 8, the thickness Tc is preferably equal to or greater than 0.1 mm and particularly preferably equal to or greater than 0.2 mm. As described later, the adhesive layer 6 enhances the adhesion of the cover 8 to the mid layer 12. The effect of the adhesive layer 6 is particularly remarkable in the golf ball 2 in which the thickness Tc of the cover 8 is small.

In the golf ball 2, the material of the mid layer 12 (first layer) differs from the material of the cover 8 (second layer). In the present invention, "material differs" means that the polymer composition of the first layer is not the same as the polymer composition of the second layer. Typically, the principal component of the base polymer of the first layer differs from the principal component of the base polymer of the second layer.

If the cover 8 is laminated directly on the mid layer 12, the cover 8 does not firmly adhere to the mid layer 12 due to the difference between the material of the cover 8 and the material of the mid layer 12. In the golf ball 2 according to the present invention, the adhesive layer 6 is present between the mid layer 12 and the cover 8. The adhesive layer 6 firmly adheres to the mid layer 12 and also to the cover 8. The adhesive layer 6 enhances the adhesion between the mid layer 12 and the cover 8. The golf ball 2 is unlikely to break even by being repeatedly hit. Even when the golf ball 2 is hit with a short iron, a scuff and a wrinkle are unlikely to occur in the cover 8. In the golf ball 2, loss of energy transfer is small when the golf ball 2 is hit with a golf club. The golf ball 2 has excellent resilience performance.

The adhesive layer 6 is formed by applying an adhesive to the surface of the mid layer 12 and drying the adhesive. The base polymer of the adhesive is a two-component curing type epoxy resin. The two-component curing type epoxy resin is obtained by curing a bisphenol A type epoxy resin with a curing agent including a polyamine compound. The bisphenol A type epoxy resin is used for the two-component curing type epoxy resin, and thus the two-component curing type epoxy resin has excellent flexibility, chemical resistance, heat resistance, and toughness.

The adhesive is obtained by mixing a base material including a bisphenol A type epoxy resin and a solvent with a curing agent including a polyamine compound and a solvent. Examples of the solvents in the base material and the curing agent include organic solvents such as xylene and toluene and water.

Specific examples of the polyamine compound include polyamide amines and modified products thereof. A polyamide amine has a plurality of amino groups and one or more amide groups. The amino groups can react with epoxy groups. A polyamide amine can be obtained by a condensation reaction of a polymerized fatty acid and a polyamine. A typical polymerized fatty acid is obtained by heating and combining natural fatty acids including a large amount of unsaturated fatty acids, such as linoleic acid, linolenic acid and the like, in the presence of a catalyst. Specific examples of unsaturated fatty acids include tall oil, soybean oil, linseed oil, and fish oil. A hydrogenated polymerized fatty acid having a dimer content of 90% by weight or greater and a trimer content of 10% by weight or less is preferred. Examples of preferable polyamines include polyethylene diamines, polyoxyalkylene diamines, and derivatives thereof.

The adhesive has a gel fraction of 40% or greater. In the adhesive layer 6 formed from the adhesive having a gel fraction of 40% or greater, a volatile component is unlikely to remain and thus there are few bubbles included. The adhesive layer 6 firmly adheres to the mid layer 12 and also to the cover 8. In this respect, the gel fraction is more preferably equal to or greater than 45% and particularly preferably equal to or greater than 50%.

The gel fraction of the adhesive is equal to or less than 80%. The adhesive having a gel fraction of 80% or less sufficiently reacts with the base polymer of the mid layer 12 and also with the base polymer of the cover 8. The adhesive layer 6 firmly adheres to the mid layer 12 and also to the cover 8. In this respect, the gel fraction is more preferably equal to or less than 76% and particularly preferably equal to or less than 70%.

The adhesive layer 6 formed from the adhesive of which the gel fraction is equal to or greater than 40% but equal to or less than 80% exerts a remarkable effect in the golf ball 2 including the thin cover 8. The adhesive layer 6 formed from the adhesive of which the gel fraction is equal to or greater than 40% but equal to or less than 80% exerts a remarkable effect in the golf ball 2 including the flexible cover 8.

At measurement of the gel fraction, immediately after the base material and the curing agent are mixed, the adhesive is applied to a PB-137T zinc phosphate treated steel plate. The size of the steel plate is "150 mm×70 mm". The thickness of the steel plate is 0.8 mm. The steel plate is maintained in the environment of 40° C. for 24 hours to form a coating film formed from the adhesive. A test piece is obtained from the steel plate and the coating film. The weight of the test piece is measured, and a weight M1 of the coating film is calculated by subtracting the weight of the steel plate from the measurement value. The test piece is immersed in acetone and allowed to stand for 24 hours. The test piece is maintained in the environment of 105° C. for one hour. The test piece is cooled to 23° C. The weight of the test piece is measured, and a weight M2 of the coating film is calculated by subtracting the weight of the steel plate from the measurement value. A gel fraction G is calculated by the following mathematical formula.

$$G=(M2/M1)\cdot 100$$

The ratio of the epoxy equivalent of the bisphenol A type epoxy resin to the amine active hydrogen equivalent of the curing agent in the adhesive is preferably equal to or greater than 2.0/1.0 but equal to or less than 13.0/1.0. In the adhesive in which the ratio is equal to or greater than 2.0/1.0, the gel fraction is not too low. Therefore, the adhesive layer 6 firmly adheres to the mid layer 12 and the cover 8. In this respect, the ratio is more preferably equal to or greater than 2.6/1.0 and particularly preferably equal to or greater than 4.0/1.0. In the adhesive in which the ratio is equal to or less than 13.0/1.0, the gel fraction is not too high. Therefore, the adhesive layer 6 firmly adheres to the mid layer 12 and the cover 8. In this respect, the ratio is more preferably equal to or less than 12.2/1.0 and particularly preferably equal to or less than 10.0/1.0.

The amine active hydrogen equivalent of the curing agent is preferably equal to or greater than 100 g/eq but equal to or less than 800 g/eq. In the adhesive in which the equivalent is equal to or greater than 100 g/eq, the gel fraction is not too high. Therefore, the adhesive layer 6 firmly adheres to the mid layer 12 and the cover 8. In this respect, the equivalent is more preferably equal to or greater than 200 g/eq and particularly preferably equal to or greater than 300 g/eq. In the adhesive in which the equivalent is equal to or less than 800 g/eq, the gel fraction is not too low. Therefore, the adhesive layer 6 firmly adheres to the mid layer 12 and the cover 8. In this respect, the equivalent is more preferably equal to or less than 600 g/eq and particularly preferably equal to or less than 500 g/eq.

The adhesive includes water as a volatile component. The term "volatile component" means both water and an organic solvent. The proportion Pw of water to the entire volatile component is preferably equal to or greater than 90% by weight. In the adhesive in which the proportion Pw is equal to or greater than 90% by weight, the gel fraction is easily controlled. In this respect, the proportion Pw is more preferably equal to or greater than 95% by weight and particularly preferably equal to or greater than 99% by weight. The proportion Pw may be 100% by weight. In light of the environment, the proportion Po of the organic solvent to the entire volatile component is preferably equal to or less than 10% by weight, more preferably equal to or less than 5% by weight, and particularly preferably equal to or less than 1% by weight.

The adhesive layer 6 may include additives such as a coloring agent (typically, titanium dioxide), an antioxidant, a light stabilizer, a fluorescent brightener, an ultraviolet absorber, an anti-blocking agent and the like. The additives may be added to the base material or the curing agent.

As described above, the adhesive layer 6 is obtained by applying the adhesive to the surface of the mid layer 12. The application can be conducted by a spray gun method, an electrostatic coating method, or a dipping method. In light of workability, the application by the spray gun method is preferred. After the application, the solvent is volatilized to permit a reaction of the bisphenol A type epoxy resin with the polyamine compound, thereby forming the adhesive layer 6.

In light of durability of the golf ball 2, the adhesive layer 6 has a thickness of preferably 0.001 mm or greater and particularly preferably 0.002 mm or greater. The thickness is preferably equal to or less than 0.1 mm. The thickness is measured by observing a cross-section of the golf ball 2 with a microscope. When the mid layer 12 has concavities and convexities on its surface from surface roughening, the thickness is measured at a convex part. The measurement is conducted so as to avoid the positions of the dimples 14.

The adhesive strength between the first layer and the second layer is preferably equal to or greater than 20 N. The golf ball 2 in which the adhesive strength is equal to or greater than 20 N has excellent durability. In this respect, the adhesive strength is more preferably equal to or greater than 22.0 N and particularly preferably equal to or greater than 22.3 N.

At measurement of the adhesive strength, a test piece including the first layer, the adhesive layer, and the second layer is cut out from the golf ball 2. The size of the test piece is "10 mm×50 mm". At an end of the test piece, the second layer is peeled from the first layer. The first layer is fixed to a first chuck, and the second layer is fixed to a second chuck. The second chuck is moved relative to the first chuck to peel the first layer from the second layer. The force applied at this peeling is measured. For the measurement, "autograph AG-IS" manufactured by SHIMADZU CORPORATION is used. The tensile rate is 50 mm/min.

The golf ball 2 has an amount of compressive deformation CD of preferably 2.0 mm or greater but 3.0 mm or less. The golf ball 2 having an amount of compressive deformation CD of 2.0 mm or greater has excellent feel at impact. In this respect, the amount of compressive deformation CD is more preferably equal to or greater than 2.1 mm and particularly preferably equal to or greater than 2.2 mm. The golf ball 2 having an amount of compressive deformation CD of 3.0 mm or less has excellent resilience performance. In this respect, the amount of compressive deformation CD is more preferably equal to or less than 2.8 mm and particularly preferably equal to or less than 2.6 mm.

At measurement of the amount of compressive deformation, first, the golf ball is placed on a hard plate made of metal. Next, a cylinder made of metal gradually descends toward the sphere. The sphere, squeezed between the bottom face of the cylinder and the hard plate, becomes deformed. A migration distance of the cylinder, starting from the state in which an initial load of 98 N is applied to the sphere up to the state in which a final load of 1274 N is applied thereto, is measured.

Also for a golf ball that includes a center, an envelope layer formed from a resin composition and covering the center, a mid layer formed from a resin composition and covering the envelope layer, and a cover formed from a resin composition and covering the mid layer, an adhesive layer is effective. In the golf ball, an adhesive layer may be present between the envelope layer and the mid layer, and an adhesive layer may be present between the mid layer and the cover.

Preferable combinations of the material of the first layer and the material of the second layer are exemplified below.

(1) Principal component of first layer: ionomer resin
 Principal component of second layer: polyurethane
(2) Principal component of first layer: polyurethane
 Principal component of second layer: ionomer resin
(3) Principal component of first layer: ionomer resin
 Principal component of second layer: styrene block-containing thermoplastic elastomer
(4) Principal component of first layer: styrene block-containing thermoplastic elastomer
 Principal component of second layer: ionomer resin
(5) Principal component of first layer: ionomer resin
 Principal component of second layer: polyamide
(6) Principal component of first layer: polyamide
 Principal component of second layer: ionomer resin
(7) Principal component of first layer: polyurethane
 Principal component of second layer: styrene block-containing thermoplastic elastomer
(8) Principal component of first layer: styrene block-containing thermoplastic elastomer
 Principal component of second layer: polyurethane
(9) Principal component of first layer: polyurethane
 Principal component of second layer: polyamide
(10) Principal component of first layer: polyamide
 Principal component of second layer: polyurethane
(11) Principal component of first layer: styrene block-containing thermoplastic elastomer
 Principal component of second layer: polyamide
(12) Principal component of first layer: polyamide
 Principal component of second layer: styrene block-containing thermoplastic elastomer

EXAMPLES

Example 1

A rubber composition was obtained by kneading 100 parts by weight of a polybutadiene (trade name "BR-730", manufactured by JSR Corporation), 37.0 parts by weight of zinc diacrylate, 5 parts by weight of zinc oxide, an appropriate amount of barium sulfate, 0.5 parts by weight of diphenyl disulfide (manufactured by Sumitomo Seika Chemicals Co., Ltd.), and 0.8 parts by weight of dicumyl peroxide (manufactured by NOF Corporation). The rubber composition was placed into a mold including upper and lower mold halves each having a hemispherical cavity, and heated at 170° C. for 20 minutes to obtain a center with a diameter of 39.7 mm. The amount of barium sulfate was adjusted such that the weight of a golf ball is 45.6 g.

A type (A) resin composition shown in Table 2 below was prepared with a twin-screw extruder. The center was covered with the resin composition by injection molding to obtain a mid layer with a thickness Tm of 1.0 mm.

An adhesive (a) shown in Table 3 below was prepared. The adhesive was applied to the surface of the mid layer with a spray gun and maintained at 23° C. for 12 hours to obtain an adhesive layer with a thickness of 0.003 mm.

A type (B) resin composition shown in Table 2 below was prepared with a twin-screw extruder. Half shells were obtained from the resin composition by compression molding. The sphere consisting of the center, the mid layer, and the adhesive layer was covered with two of the half shells and placed into a mold including upper and lower mold halves each having a hemispherical cavity. A cover was obtained by compression molding. The cover has a thickness Tc of 0.5 mm. A paint layer was formed around the cover to obtain a golf ball of Example 1.

Examples 2 to 6 and Comparative Examples 1 to 7

Golf balls having specification shown in Tables 4 to 6 below were obtained by the same manufacturing method as in Example 1.

[Shot with Driver]

A driver with a metal head (W#1) was attached to a swing machine manufactured by True Temper Co. A golf ball was hit under the condition of a head speed of 45 m/sec. The spin rate immediately after the hit and the flight distance (the distance from the launch point to the stop point) were measured. The average value of 10 measurements is shown in Tables 4 to 6 below.

[Shot with Sand Wedge]

A sand wedge (SW) was attached to the swing machine. A golf ball was hit under the condition of a head speed of 21 m/sec. The spin rate was measured immediately after the hit. The average value of 10 measurements is shown in Tables 4 to 6 below.

[Measurement of Initial Speed]

A golf ball was maintained in the environment of 23° C. A driver with a metal head was attached to the swing machine. The golf ball was repeatedly hit under the condition of a head speed of 45 m/sec. The speed of the ball was measured at the 10th hit. The result is shown as an index in Tables 4 to 6 below.

[Breaking Test and Evaluation of Durability]

A golf ball was maintained in the environment of 23° C. A driver with a metal head was attached to the swing machine. The golf ball was repeatedly hit under the condition of a head speed of 45 m/sec until the golf ball was broken. The number of hits required to break the golf ball is shown as an index in Tables 4 to 6.

TABLE 1

| Composition of Center (parts by weight) | I | II |
|---|---|---|
| BR-730 | 100 | 100 |
| Zinc diacrylate | 37.0 | 37.5 |
| Zinc oxide | 5 | 5 |
| Barium sulfate | Appropriate amount | Appropriate amount |
| Diphenyl disulfide | 0.5 | 0.5 |
| Dicumyl peroxide | 0.8 | 0.8 |

TABLE 2

| Compositions of Mid Layer and Cover (parts by weight) | (A) | (B) | (C) | (D) |
|---|---|---|---|---|
| Surlyn 8945 | 55 | — | — | — |
| Himilan AM7329 | 45 | — | — | — |
| Elastollan XNY80A | — | 100 | — | — |
| Elastollan XNY90A | — | — | 100 | — |
| Elastollan XNY97A | — | — | — | 100 |
| Titanium dioxide | 3 | 3 | 3 | 3 |
| Ultramarine blue | — | 0.04 | 0.04 | 0.04 |
| Hardness (Shore D) | 65 | 26 | 38 | 47 |

TABLE 3

| Composition of Adhesive | (a) | (b) | (c) | (d) | (e) | (f) |
|---|---|---|---|---|---|---|
| Base material | | | | | | |
| Bisphenol A type epoxy resin | — | — | — | — | — | 30 |
| Bisphenol A type epoxy resin | 36 | 36 | 36 | 36 | 36 | — |
| Xylene | — | — | — | — | — | 35 |
| Toluene | — | — | — | — | — | 35 |
| Water | 64 | 64 | 64 | 64 | 64 | — |
| Epoxy equivalent (g/eq) | 1405 | 1405 | 1405 | 1405 | 1405 | 1633 |
| Curing agent | | | | | | |
| Modified polyamide amine | — | — | — | — | — | 40 |
| Modified polyamide amine | 44 | — | — | — | — | — |
| Modified polyamide amine | — | 44 | — | — | — | — |
| Modified polyamide amine | — | — | — | 44 | — | — |
| Modified polyamide amine | — | — | 44 | — | — | — |
| Modified polyamide amine | — | — | — | — | 44 | — |
| Xylene | — | — | — | — | — | 30 |
| Toluene | — | — | — | — | — | 25 |
| Water | 50 | 50 | 50 | 50 | 50 | — |
| Propylene glycol | 1 | 1 | 1 | 1 | 1 | — |
| Titanium dioxide | 5 | 5 | 5 | 5 | 5 | 5 |
| Active hydrogen equivalent (g/eq) | 348 | 115 | 536 | 89 | 810 | 1345 |
| Water proportion Pw (%) | 99.7 | 99.9 | 99.6 | 99.9 | 99.4 | 0 |
| Organic solvent proportion Po (%) | 0.3 | 0.1 | 0.4 | 0.1 | 0.6 | 100 |
| Epoxy equivalent/ active hydrogen equivalent | 4.0 | 12.2 | 2.6 | 15.8 | 1.7 | 1.2 |
| Base material/curing agent | 4/1 | 12/1 | 3/1 | 15/1 | 2/1 | 1/1 |
| Gel fraction (%) | 64 | 45 | 76 | 35 | 84 | 88 |

In Table 3, for adhesives (a) to (e), a base material of a water-based epoxy adhesive manufactured by SHINTO PAINT CO., LTD. (epoxy equivalent: 1405 g/eq) was used. For an adhesive (f), a base material of an organic solvent-based epoxy adhesive manufactured by SHINTO PAINT CO., LTD. (epoxy equivalent: 1633 g/eq) was used. The details of a curing agent are as follows.

Adhesive (a): water-based amine curing agent manufactured by SHINTO PAINT CO., LTD. (active hydrogen equivalent: 348 g/eq).

Adhesive (b): water-based amine curing agent manufactured by SHINTO PAINT CO., LTD. (active hydrogen equivalent: 115 g/eq).

Adhesive (c): water-based amine curing agent manufactured by SHINTO PAINT CO., LTD. (active hydrogen equivalent: 536 g/eq).

Adhesive (d): water-based amine curing agent manufactured by SHINTO PAINT CO., LTD. (active hydrogen equivalent: 89 g/eq).

Adhesive (e): water-based amine curing agent manufactured by SHINTO PAINT CO., LTD. (active hydrogen equivalent: 810 g/eq).

Adhesive (f): organic solvent-based amine curing agent manufactured by SHINTO PAINT CO., LTD. (active hydrogen equivalent: 1345 g/eq).

In addition to the adhesives (a) to (f) shown in Table 3, the following adhesives (g) and (h) were prepared.

[Adhesive (g)]

Mixture of 100 parts by weight of a carboxyl group-containing polyurethane aqueous solution and 10 parts by weight of a polycarbodiimide aqueous dispersion.

Carboxyl group-containing polyurethane aqueous solution: trade name “W-615” manufactured by Mitsui Takeda Chemical Co., Ltd.

Polycarbodiimide aqueous dispersion: trade name “Carbodilite E-03A” manufactured by Mitsui Takeda Chemical Co., Ltd.

[Adhesive (h)]

Base material: mixture of a polyether polyol and a polyester polyol, hydroxyl value: 82 mgKOH/g Curing agent: hexamethylene diisocyanate Equivalent ratio: NCO/OH=1.2/1.0

TABLE 4

Results of Evaluation

| | | Example | | | |
|---|---|---|---|---|---|
| | | 1 | 2 | 3 | 4 |
| Center | Composition | I | I | I | I |
| | Diameter (mm) | 39.7 | 39.7 | 39.7 | 39.7 |
| | Surface hardness (JIS-C) | 83 | 83 | 83 | 83 |
| Mid layer | Composition | (A) | (A) | (A) | (A) |
| | Hardness Hm (Shore D) | 65 | 65 | 65 | 65 |
| | Thickness (mm) | 1.0 | 1.0 | 1.0 | 1.0 |
| Adhesive layer | Composition | (a) | (b) | (c) | (a) |
| | Gel fraction (%) | 64 | 45 | 76 | 64 |
| | Thickness (mm) | 0.003 | 0.003 | 0.003 | 0.003 |
| Cover | Composition | (B) | (B) | (B) | (C) |
| | Hardness Hc (Shore D) | 26 | 26 | 26 | 38 |
| | Thickness (mm) | 0.5 | 0.5 | 0.5 | 0.5 |
| Ball | Deformation CD (mm) | 2.4 | 2.4 | 2.4 | 2.4 |
| | Hm − Hc | 39 | 39 | 39 | 27 |
| W#1 spin rate (rpm) | | 2950 | 2950 | 2950 | 2900 |
| W#1 flight distance (m) | | 241 | 240 | 240 | 242 |
| SW spin rate (rpm) | | 6900 | 6900 | 6900 | 6770 |
| Initial speed (index) | | 115 | 108 | 107 | 118 |
| Durability (index) | | 120 | 110 | 109 | 125 |
| Adhesive strength (N) | | 24.8 | 22.3 | 22.0 | 25.5 |

TABLE 5

Results of Evaluation

| | | Example | | Comparative Example | |
|---|---|---|---|---|---|
| | | 5 | 6 | 1 | 2 |
| Center | Composition | I | II | I | I |
| | Diameter (mm) | 39.7 | 40.1 | 39.7 | 39.7 |
| | Surface hardness (JIS-C) | 83 | 83 | 83 | 83 |
| Mid layer | Composition | (A) | (A) | (A) | (A) |
| | Hardness Hm (Shore D) | 65 | 65 | 65 | 65 |
| | Thickness (mm) | 1.0 | 1.0 | 1.0 | 1.0 |
| Adhesive layer | Composition | (a) | (a) | (e) | (f) |
| | Gel fraction (%) | 64 | 64 | 84 | 88 |
| | Thickness (mm) | 0.003 | 0.003 | 0.003 | 0.003 |
| Cover | Composition | (D) | (B) | (B) | (B) |
| | Hardness Hc (Shore D) | 47 | 26 | 26 | 26 |
| | Thickness (mm) | 0.5 | 0.3 | 0.5 | 0.5 |
| Ball | Deformation CD (mm) | 2.4 | 2.4 | 2.4 | 2.4 |
| | Hm − Hc | 18 | 39 | 39 | 39 |
| W#1 spin rate (rpm) | | 2850 | 2800 | 2950 | 2950 |
| W#1 flight distance (m) | | 243 | 244 | 238 | 238 |
| SW spin rate (rpm) | | 6650 | 6820 | 6900 | 6900 |
| Initial speed (index) | | 120 | 113 | 101 | 100 |
| Durability (index) | | 130 | 115 | 102 | 100 |
| Adhesive strength (N) | | 26.4 | 24.1 | 19.2 | 18.8 |

TABLE 6

Results of Evaluation

| | | Comparative Example | | | | |
|---|---|---|---|---|---|---|
| | | 3 | 4 | 5 | 6 | 7 |
| Center | Composition | I | I | I | I | II |
| | Diameter (mm) | 39.7 | 39.7 | 39.7 | 39.7 | 40.1 |
| | Surface hardness (JIS-C) | 83 | 83 | 83 | 83 | 83 |
| Mid layer | Composition | (A) | (A) | (A) | (A) | (A) |
| | Hardness Hm (Shore D) | 65 | 65 | 65 | 65 | 65 |
| | Thickness (mm) | 1.0 | 1.0 | 1.0 | 1.0 | 1.0 |
| Adhesive layer | Composition | (d) | — | (g) | (h) | (f) |
| | Gel fraction (%) | 35 | — | — | — | 88 |
| | Thickness (mm) | 0.003 | — | 0.003 | 0.003 | 0.003 |
| Cover | Composition | (B) | (B) | (B) | (B) | (B) |
| | Hardness Hc (Shore D) | 26 | 26 | 26 | 26 | 26 |
| | Thickness (mm) | 0.5 | 0.5 | 0.5 | 0.5 | 0.3 |
| Ball | Deformation CD (mm) | 2.4 | 2.4 | 2.4 | 2.4 | 2.4 |
| | Hm-Hc | 39 | 39 | 39 | 39 | 39 |
| W#1 spin rate (rpm) | | 2950 | 2950 | 2950 | 2950 | 2800 |
| W#1 flight distance (m) | | 238 | 235 | 236 | 236 | 241 |

TABLE 6-continued

Results of Evaluation

| | Comparative Example | | | | |
|---|---|---|---|---|---|
| | 3 | 4 | 5 | 6 | 7 |
| SW spin rate (rpm) | 6900 | 6850 | 6900 | 6900 | 6820 |
| Initial speed (index) | 102 | 80 | 90 | 88 | 90 |
| Durability (index) | 102 | 20 | 88 | 70 | 85 |
| Adhesive strength (N) | 19.5 | 3.4 | 13.6 | 12.8 | 17.4 |

As is obvious from Tables 4 to 6, the golf balls of Examples are excellent in various performance characteristics. From the results of evaluation, advantages of the present invention are clear.

The golf ball according to the present invention is suitable for use in golf tournaments and practice at driving ranges. The above description is merely for illustrative examples, and various modifications can be made without departing from the principles of the present invention.

What is claimed is:

1. A golf ball comprising: a first layer constituting a portion of the main body of the golf ball; a second layer, also constituting a portion of the main body of the golf ball, of which a material differs from a material of the first layer; and an adhesive layer formed from an adhesive and positioned between the first layer and the second layer, wherein a base polymer of the adhesive is a two-component curing type epoxy resin obtained by curing a bisphenol A type epoxy resin with a curing agent including a polyamine compound having an active hydrogen atom, wherein the weight of the active hydrogen equivalent of the curing agent is equal to or greater than 100 g/eq but equal to or less than 800 g/eq, a ratio of the weight of one equivalent of epoxy of the bisphenol A type epoxy resin to the weight of one equivalent of active hydrogen of the curing agent in the adhesive being equal to or greater than 2.0/1.0 but equal to or less than 12.2/1.0, and a gel fraction of the adhesive is equal to or greater than 45% but equal to or less than 76%.

2. The golf ball according to claim 1, wherein a volatile component of the adhesive includes water, and a proportion of the water to the entire volatile component is equal to or greater than 90% by weight.

3. The golf ball according to claim 1, wherein a thickness of the adhesive layer is equal to or greater than 0.001 mm but equal to or less than 0.1 mm.

4. The golf ball according to claim 1, wherein an adhesive strength between the first layer and the second layer is equal to or greater than 20 N.

5. The golf ball according to claim 1, wherein a difference between a hardness of the first layer and a hardness of the second layer is equal to or greater than 18.

6. The golf ball according to claim 1, wherein the first layer is formed from a resin composition, and a principal component of a base polymer of the resin composition is one or more members selected from the group consisting of ionomer resins, polyurethanes, styrene block-containing elastomers, and polyamides, the second layer is formed from a resin composition, and a principal component of a base polymer of the resin composition is one or more members selected from the group consisting of ionomer resins, polyurethanes, styrene block-containing elastomers, and polyamides, and the principal component of the base polymer of the first layer differs from the principal component of the base polymer of the second layer.

7. The golf ball according to claim 6, wherein said second layer is the outermost layer of the main body and said second layer constitutes the cover layer of the golf ball; and a paint layer positioned outside the main body, wherein, in said cover layer, the principal component of the base polymer is a polyurethane, and the cover layer has a Shore D hardness of 48 or less and a thickness of 0.6 mm or less.

8. The golf ball according to claim 6, wherein the principal component of the base polymer of the first layer is an ionomer resin.

9. The golf ball according to claim 1, wherein a hardness of the first layer is equal to or greater than 55 but equal to or less than 72.

10. The golf ball according to claim 1, wherein a thickness of the first layer is equal to or greater than 0.3 mm but equal to or less than 2.5 mm.

* * * * *